United States Patent [19]

Carter et al.

[11] Patent Number: 4,596,021
[45] Date of Patent: Jun. 17, 1986

[54] MODEM FOR SWITCHING BETWEEN VOICE AND DATA COMMUNICATIONS ON A SINGLE TELEPHONE CALL

[75] Inventors: Kelly Carter, Denver, Colo.; Steve Gallagher, Mountain View, Calif.; Gregory Iverson, Boulder, Colo.; Kenneth R. Krechmer, Palo Alto, Calif.

[73] Assignee: Prentice Corporation, Sunnyvale, Calif.

[21] Appl. No.: 599,568

[22] Filed: Apr. 12, 1984

[51] Int. Cl.⁴ .................... H04J 3/17; H04M 11/06
[52] U.S. Cl. .................... 375/5; 179/2 DP; 370/110.1
[58] Field of Search ............... 375/5; 370/110.1, 111; 179/2 DP, 2 AM

[56] References Cited

U.S. PATENT DOCUMENTS 3,517,137  6/1970  Ribner .................. 179/2 DP
4,356,348 10/1982  Smith .................... 179/81 R

OTHER PUBLICATIONS

"Intelligent Telephone", Sederholm and Van den Berg, *IBM Technical Disclosure Bulletin*, vol. 23, No. 9, Feb. '81, pp. 4006-4008.

*Primary Examiner*—Benedict V. Safourek
*Assistant Examiner*—Raymond C. Glenny
*Attorney, Agent, or Firm*—Kirkland & Ellis

[57] ABSTRACT

The present invention relates to a modem that allows the user to switch back and forth between voice and data telecommunications during the same phone call without redialing. Such switching back and forth between voice and data telecommunications is accomplished by lifting the telephone handset for voice communications and replacing the telephone handset for resumption of data communications. The present invention also allows a local user to communicate with a remote user via a speaker at the remote modem location without the remote user picking up the remote handset.

11 Claims, 1 Drawing Figure

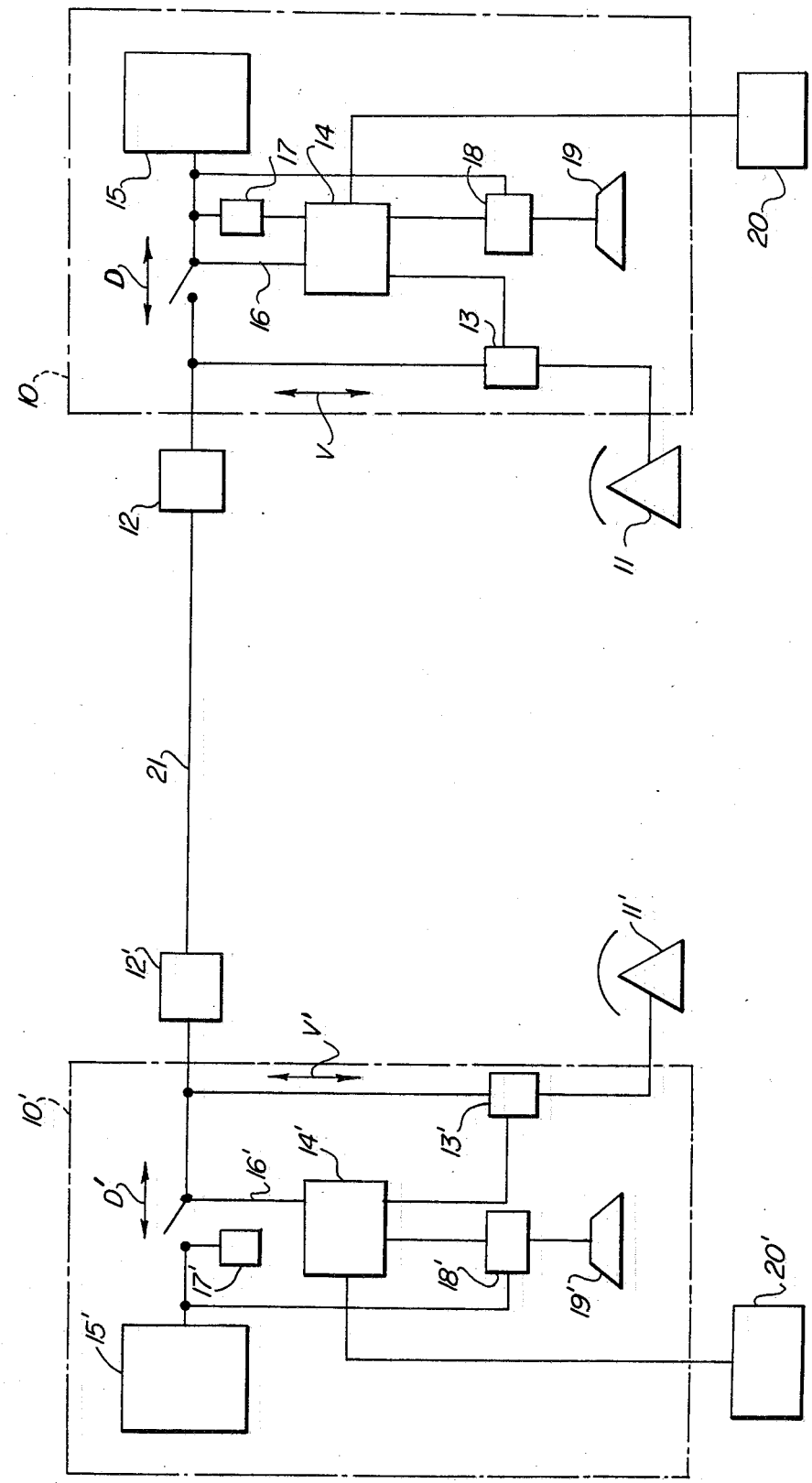

MODEM FOR SWITCHING BETWEEN VOICE AND DATA COMMUNICATIONS ON A SINGLE TELEPHONE CALL

BACKGROUND OF THE INVENTION

1. Field of the Invention

This invention relates broadly to the field of modems and in particular to modems that can switch between voice and data communications.

2. Description of the Prior Art

Modems are used to communicate digital information from one data terminal device to another via a telephone line. As the modem is being used to transmit data via the telephone line, a need may arise to use the telephone line for voice communication. Therefore, it is an important feature of modems for the user to be able to interrupt data communications for purposes of making a voice call.

Other modem systems have been used to switch between voice and data communications, but they have required complex commands from the users to the modems and between modems. Under one approach, the user switches from data to voice by sending code between his local modem and the remote modem and switching the handset on or off under modem control. Under a second approach, a speaker is used at the remote modem with a timer, but the speaker and timer are enabled and disabled only after a complex series of commands by the user to the local modem before and after, respectively, the voice portion of the communication.

Both of these prior systems are more complex than an ordinary voice call where the user simply picks up the telephone handset. The present invention overcomes this drawback for switching back and forth between data and voice communications.

SUMMARY OF THE INVENTION

It is the object of the invention to provide an apparatus for switching back and forth between data and voice communications.

It is a more specific object of the present invention to provide an apparatus for switching back and forth between data and voice communications on a single telephone call without redialing by merely picking up the telephone handset during the voice portions of the communications.

It is another object of the invention to provide an apparatus that allows a modem to autodial voice calls.

Finally, it is an object of this invention to provide an apparatus that permits the user of an autoanswering modem to switch to voice communication when the modem accidentally receives a voice call.

The invention achieves its objectives by sensing when the local telephone handset is lifted (which, in the preferred embodiment, is done by means of a phone current sensor that senses line current associated with the locally attached telephone handset or other peripheral device). The loss of received carrier at the remote modem causes the remote processor to enable the remote speaker for a set period of time. The local user then communicates to the remote user through the remote modem's speaker, and a voice telephone call can be completed if the remote handset is picked up within the set time period. After the voice communication, the users may return to data communications by hanging up their respective handsets or by, in addition to hanging up the handsets, entering commands to the microprocessors in their respective modems.

BRIEF DESCRIPTION OF THE DRAWING

The drawing is a block diagram of the modem system of the preferred embodiment of the present invention.

DETAILED DESCRIPTION OF THE PREFERRED EMBODIMENT

Referring to the block diagram of the drawing, the components referred to by numbers followed by a prime symbol are associated with a remote modem 10', and the components referred to by unprimed numbers are associated with a local modem 10. Modems 10 and 10' are connected to telephone sets 11 and 11' by standard connections and to telephone line 21 by connections 12 and 12'. Microprocessors 14 and 14' are connected to phone current sensors 13 and 13', modulator/demodulator means 15 and 15', off-hook relays 16 and 16', energy detectors 17 and 17', audio drivers 18 and 18' and speakers 19 and 19' and data terminals 20 and 20'. Data terminals 20 and 20' could be, for example, microcomputers. Phone current sensors 13 and 13' sense when telephone handsets 11 and 11' are picked up, which is communicated to the respective microprocessor 14 or 14'. The modulator portions of modulator/demodulators 15 and 15' modulate a carrier signal with digital information received from a transmitting data terminal so that the digital information can be communicated over the telephone line as an analog signal. The demodulator portions demodulate the analog signal received over the telephone line so that it can be communicated to a receiving data terminal in digital form. Off-hook switches 16 and 16', which could be relays, for example, disconnect the modulator/demodulator 15 and 15', respectively, from the telephone line 21 on command from the microprocessor 14 or 14', respectively. Energy detectors 17 and 17' sense when the energy of the signal to the associated demodulator portion has been reduced.

During data transmission, modulator 15 is "off-hook" (i.e., it has control of the telephone line), and the telephone handset 11 is "on-hook" (i.e., it does not have control of the telephone line). Data is modulated and transmitted from the local modulator to the remote location, where it is demodulated. The path and directions of data flow are indicated by arrows D and D'.

To switch from data to voice communication, the local user lifts handset 11. Phone current sensor 13 senses that the locally attached telephone handset 11 has been picked up, and a signal is sent to microprocessor 14 that the handset 11 has been lifted. The microprocessor 14 causes the modem 10 to go on-hook through off-hook relay 16. At this point, the local telephone handset 11 has control of the telephone line 21. The path and directions of voice communications are indicated by arrows V and V'.

When the local modem 10 goes on-hook and control is pass to the local telephone handset 11, remote energy detector 17' senses the loss of carrier signal from the local modem 10 and signals remote microprocessor 14'. The remote microprocessor 14' then enables remote speaker drive 18' for a predetermined interval (e.g., seven seconds). If a remote user picks up remote handset 11' within the predetermined internal, a voice connection is completed between the telephone sets 11 and

11'. If not, the remote modem 10' goes on-hook, and the connection over the telephone line 21 is ended.

If the remote user has picked up the remote handset 11' within the predetermined interval the local and remote handsets 11 and 11' are connected over the telephone line 21, and a voice communication may then take place. Following such a voice communication, the users may wish to return to data communication on the same telephone call without redialing. This can be done automatically by the microprocessors 14 and 14' upon the current 13 and 13' sensing the handsets 11 and 11' going on-hook. Alternatively, this can be accomplished by the remote user entering a receive command to the remote microprocessor 14', via remote terminal 20', and the local user entering a transmit command to the local microprocessor 14 via the local terminal 20. Each user then hangs up. Remote and local phone current sensors 13' and 13 detect a reduction in current (due to handsets 11 and 11' going on-hook) and provide a corresponding signal to microprocessors 14' and 14, which then switch access to the telephone line 21 from the telephone handsets 11' and 11 to modems 10' and 10. The modems 10 and 10' then initiate a "handshaking routine" (as is known in the art) that allows them to communicate data to each other.

Both the local and remote modems 10 and 10' can be used to autodial voice calls for the user. For example, the local user enters a command via the terminal 20 to the microprocessor 14 to autodial a telephone number. The microprocessor 14 causes this number to be dialed by the modem 10. Either the local or remote user may then take over the call for voice communications by picking up telephone handset 11 or 11'. When a handset is picked up, phone current sensor 13 or 13', respectively, signals the microprocessor 14 or 14', respectively, which causes the modem 10 or 10', respectively, to go on-hook by signalling off hook relay 16 or 16'. The telephone handset 11 or 11' then has control of the telephone line 21, and the user may make ordinary voice communications in the manner described above.

In other situations, a user may command the modem 10 to autoanswer calls made to the modem's telephone number. If a third party calls the modem number wishing to make a voice call to the modem user, the modem 10 will cause the call to be answered, and it will begin executing the handshaking routine. The local modem user can take control of the telephone line 21 for voice communication with the third party by lifting the handset 11. When the handset 11 is lifted, the current sensor 13 signals the microprocessor 14, which uses the off-hook relay 16 to disconnect the modem 10 from the outside line 21. The handset 11 then has control of the line 21 for voice communications.

While the preferred embodiment of the invention has been illustrated and described, it is to be understood that the invention is not limited to the precise construction herein disclosed, and the right is reserved to all changes and modifications coming within the scope of the invention as defined in the appended claims.

We claim:

1. An apparatus for switching between transmission of data communications and transmission of voice communications over a communications channel having a local end and a remote end, comprising:

local voice terminal means for transmitting and receiving via the communications channel voice communications at the local end of the communications channel when said local voice terminal means is actuated, local modem means for modulating with digital information and transmitting a local carrier signal over the communications channel;

remote modem means for receiving over the communications channel and demodulating the local carrier signal;

remote carrier detect means for detecting whether a local carrier signal is being received by said remote modem means, said remote carrier detect means generating a remote carrier detect signal that is in a first state when the local carrier signal is being received by said remote modem means and in a second state when the local carrier signal is not being received by said remote modem means;

remote indicator means responsive to the remote carrier detect signal for generating a remote indicator signal when the remote carrier detect signal is in the second state; and local logic means for stopping transmission of the local carrier signal by said local modem means when said local voice terminal means is actuated, whereby when said local voice terminal means is actuated, said local logic means causes said local modem means to cease transmitting the local carrier signal, which is detected by said remote carrier detect means, in response to which the remote carrier detect signal changes from the first state to the second state causing said remote indicator means to generate the remote indicator signal.

2. The apparatus as claimed in claim 1 wherein said remote indicator means generates the remote indicator signal for only a predetermined length of time upon the remote carrier detect signal changing from the first state to the second state.

3. The apparatus as claimed in claim 2 further comprising remote voice terminal means for transmitting and receiving via the communications channel voice communications at the remote end of the communications channel when said remote voice terminal means is actuated, said local and remote voice terminal means, respectively, not being capable of transmitting or receiving voice communications unless actuated, wherein the communications channel between said local and remote voice terminal means is disabled after the predetermined length of time unless said remote voice terminal means is actuated within the predetermined length of time.

4. The apparatus as claimed in claim 1 wherein said remote modem means also is adapted for modulating with digital information and transmitting a remote carrier signal over the communications channel, and wherein said local modem means also is adapted for receiving over the communications channel and demodulating the remote carrier signal, the apparatus further comprising:

remote voice terminal means for transmitting and receiving via the communications channel voice communications at the remote end of the communications channel when said remote voice terminal means is actuated;

local carrier detect means for detecting whether a remote carrier signal is being received by said local modem means, said local carrier detect means generating a local carrier detect signal that is in a first state when the remote carrier signal is being received by said local modem means and in a second state when the remote carrier signal is not being received by said local modem means;

local indicator means responsive to the local carrier detect signal for generating a local indicator signal when the local carrier detect signal is in the second state; and remote logic means for stopping transmission of the remote carrier signal by said remote modem means when said remote voice terminal means is actuated, whereby actuation of either said local or remote voice terminal means causes the remote or local indicator signal, respectively, to be generated, thereby causing said remote or local indicator means, respectively, to generate a remote or local indicator signal, respectively.

5. The apparatus as claimed in claim 4 wherein said local and remote voice terminal means further comprise local and remote telephone handsets, respectively, and wherein said local and remote telephone handsets are actuated when they are off-hook and not actuated when they are on-hook, voice communications between said local and remote telephone handsets via the communications channel being possible when said local and remote telephone handsets are both off-hook.

6. The apparatus as claimed in claim 5 wherein said local and remote logic means further comprise local and remote sensor means for sensing when said local and remote handset, respectively, is off-hook.

7. The apparatus as claimed in claim 4 further comprising local and remote data terminal means for providing local and remote, respectively, digital information to said local and remote modem means, respectively, for modulating the local carrier signal and the remote carrier signal, respectively, and for receiving local and remote digital information obtained by the demodulation of the local carrier signal and the remote carrier signal, respectively, by said remote and local modem means, respectively.

8. The apparatus as recited in claim 4 wherein said local and remote indicator means each further comprises local and remote audio output means, respectively, for receiving and sounding voice signals from said remote and local voice terminal means, respectively, when the local or remote indicator signal, respectively, is being generated, whereby upon actuation of said local voice terminal means voice can be communicated therefrom over the communications channel and made audible by said remote audio output means, and upon actuation of said remote voice terminal means voice can be communicated therefrom over the communications channel and made audible by said local audio output means.

9. The apparatus as claimed in claim 4 wherein when said local and remote voice terminal means both have been actuated and then are both deactuated, said local and remote logic means cause said local and remote modem means, respectively, to resume transmitting the local and remote carrier signal, respectively.

10. The apparatus as claimed in claim 1 further comprising:

remote voice terminal means for transmitting and receiving via the communications channel voice communications at the remote end of the communications channel when said remote voice terminal means is actuated, wherein said local and remote voice terminal means permit voice communications over the communications channel between the local and remote ends thereof when said local and remote voice terminal means are both actuated.

11. The apparatus as claimed in claim 5 wherein said local and remote voice terminal means, respectively, is not capable of transmitting or receiving voice communications unless actuated.

* * * * *